(12) United States Patent
Kobayashi

(10) Patent No.: US 10,591,341 B2
(45) Date of Patent: Mar. 17, 2020

(54) DISPLAY CONTROLLER

(71) Applicant: DENSO CORPORATION, Kariya, Aichi-pref. (JP)

(72) Inventor: Masayuki Kobayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 174 days.

(21) Appl. No.: 15/939,681

(22) Filed: Mar. 29, 2018

(65) Prior Publication Data

US 2018/0306629 A1 Oct. 25, 2018

(30) Foreign Application Priority Data

Apr. 19, 2017 (JP) .................................. 2017-82903

(51) Int. Cl.
*G06F 19/00* (2018.01)
*G01F 23/00* (2006.01)
*B60K 35/00* (2006.01)

(52) U.S. Cl.
CPC .......... *G01F 23/0061* (2013.01); *B60K 35/00* (2013.01); *B60K 2370/174* (2019.05); *B60K 2370/186* (2019.05); *Y02T 10/84* (2013.01)

(58) Field of Classification Search
CPC ............... G01F 23/0061; B60K 35/00; B60K 2370/174
See application file for complete search history.

(56) References Cited

U.S. PATENT DOCUMENTS

2011/0196600 A1* 8/2011 Henderson ......... G01C 21/3697 701/123
2017/0369009 A1* 12/2017 Vucelic .................. B60K 35/00
2018/0306629 A1* 10/2018 Kobayashi .......... G01F 23/0061

FOREIGN PATENT DOCUMENTS

| JP | 06-077836 A | 3/1994 |
| JP | 10-198896 A | 7/1998 |
| JP | 2004-251786 A | 9/2004 |
| JP | 2011-117838 A | 6/2011 |

* cited by examiner

*Primary Examiner* — Adam M Alharbi
(74) *Attorney, Agent, or Firm* — Posz Law Group, PLC

(57) ABSTRACT

A display controller calculates a driver-related fuel economy value and a performance value indicating an amount of difference between the calculated driver-related fuel economy value and a baseline value. The display controller displays the performance value on a display device during vehicle operation. A memory in the vehicle stores a number of initial fuel economy values that are replaced by the driver-related fuel economy values as new driver-related fuel economy values are calculated. An oldest fuel mileage value stored in the memory is replaced with a newly calculated fuel mileage. The baseline value used to calculate the performance value is an average of the number of the fuel economy values stored in the memory.

10 Claims, 12 Drawing Sheets

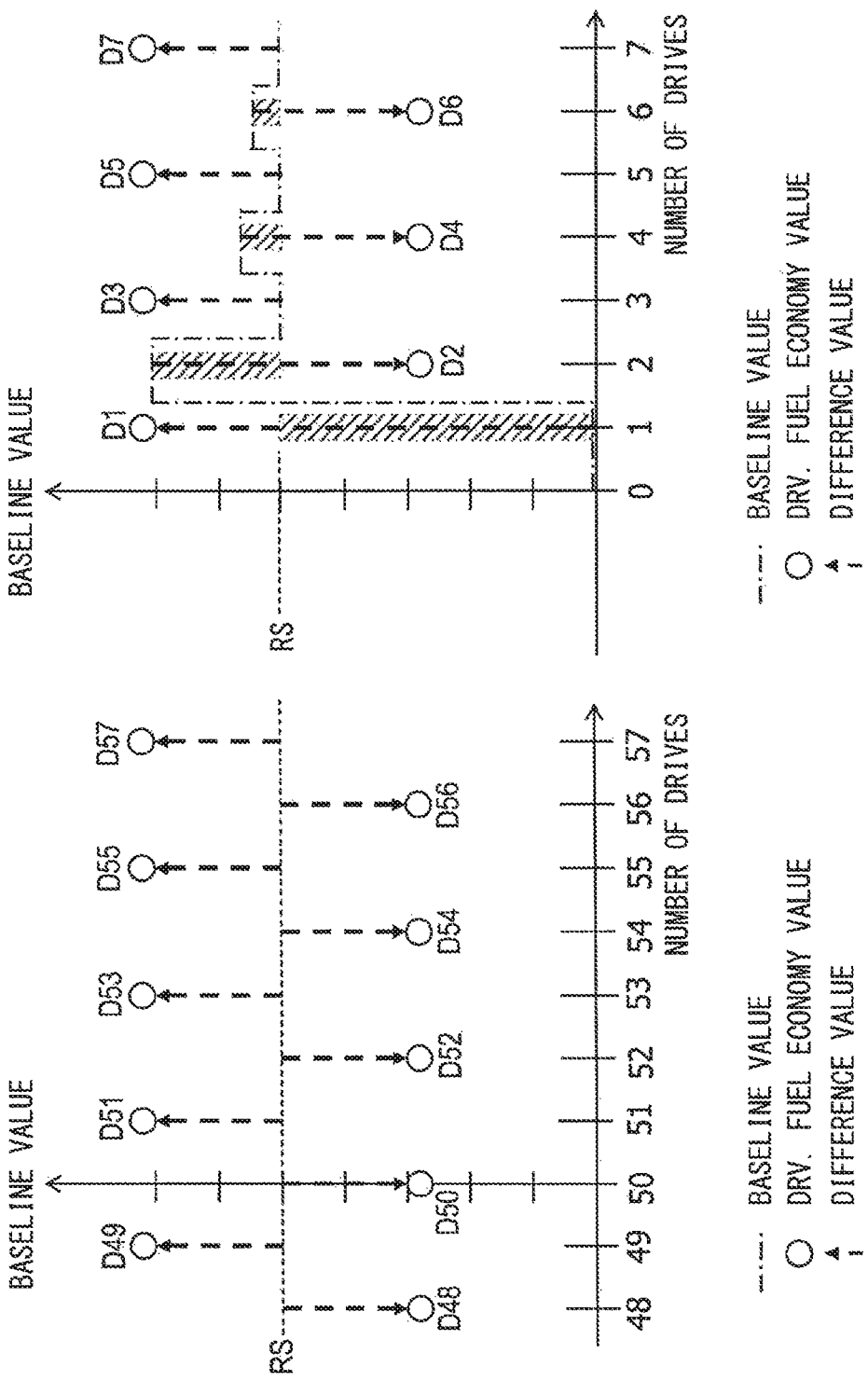

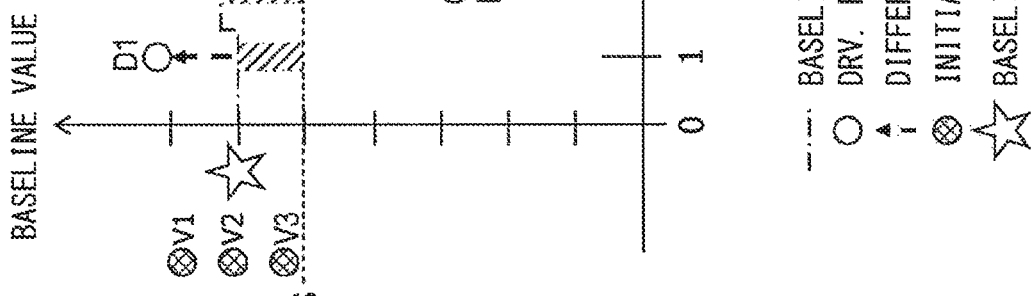
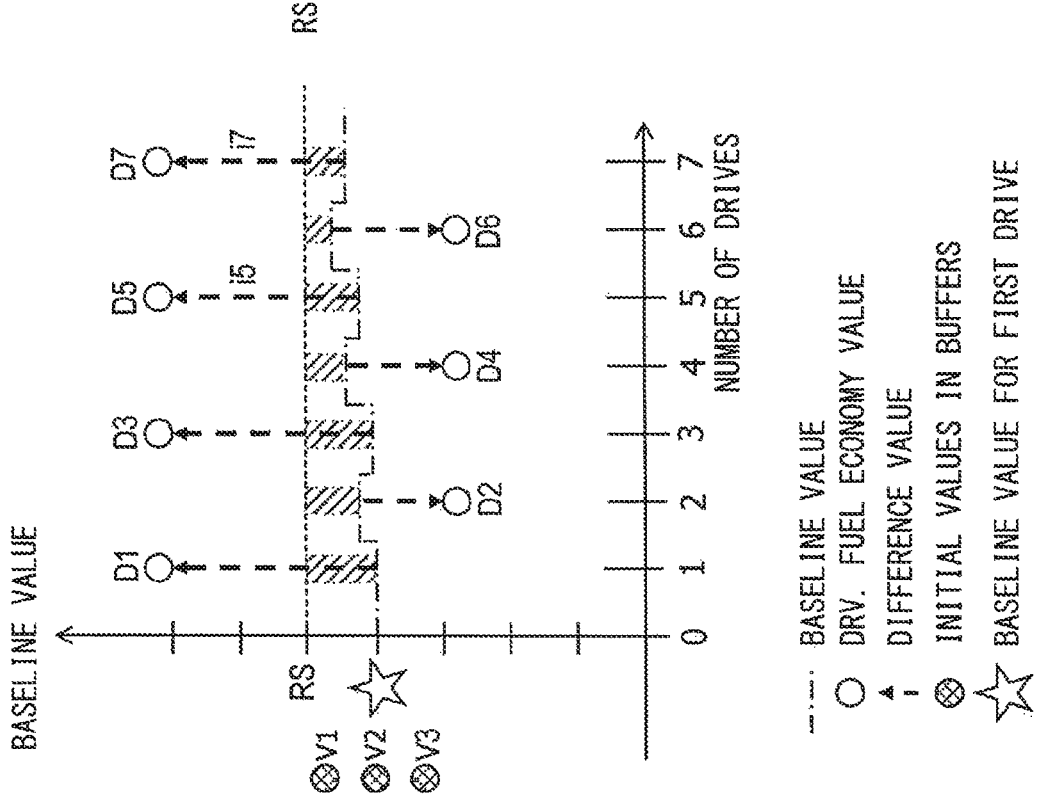

(DRIVER SCREEN)

DISPLAY CONTROLLER

CROSS REFERENCE TO RELATED APPLICATION

The present application is based on and claims the benefit of priority of Japanese Patent Application No. 2017-082903, filed on Apr. 19, 2017, the disclosure of which is incorporated herein by reference.

TECHNICAL FIELD

The present disclosure generally relates to a display controller that displays a fuel economy performance value.

BACKGROUND INFORMATION

The fuel economy of a vehicle can be approximated using different methods based on the actual performance of a vehicle. That is, by measuring the vehicle's actual performance, the fuel economy of the vehicle may be quantified and displayed on an in-vehicle display. More practically, a fuel economy of the vehicle or "mpg" may be quantified from actual vehicle performance measurements and factors associated with a driver's driving behavior and displayed to the driver. By viewing the fuel economy display, a driver may be able to understand how the driver's driving behavior influences the vehicle's fuel economy. The fuel economy is typically measured and displayed in values such as miles per gallon (mpg) or kilometers per liter (km/L), and fuel economy may be displayed as both instantaneous and average values. Patent document 1, i.e., Japanese Publication 2011-117838, discloses measuring a vehicle's fuel economy and displaying the fuel economy on an in-vehicle display.

Patent document 1 discloses a display controller that calculates and displays a specific-driver-related fuel economy based on specific vehicle performance for each driving instance (i.e., trip) driven by the driver. The specific-driver-related fuel economy calculation may be compared with a baseline value that represents an average fuel economy of many drivers or the fuel economy based on an average driver. In other words, displaying the difference between the specific-driver-related fuel economy calculation and the baseline value can serve as a base to illustrate trends showing whether a driver's driving behavior is leading to a better-than-average fuel economy or alert a driver that there may be room for improvement.

By viewing such a difference, the driver is better able to grasp whether there has been any improvement to the driver-specific fuel economy. That is, the driver may strive to continue fuel-efficient driving behavior to stay ahead of the baseline fuel economy level or may be motivated to further improve such driving behavior. As such, the display controller may not only be used to inform the driver, but also provide some fun to a driver by motivating a driver to exhibit driving behavior to reach a certain fuel economy goal.

The previously-described baseline fuel economy value may be calculated as the average fuel economy based on many different driving events or trips.

In such case, an average of the driver-specific fuel economy to derive a driver-specific baseline value may only be calculable after a certain number of drive events/trips. That is, the driver may have to drive the vehicle many times before the display device displays a driver's baseline fuel economy and +/− trend value illustrating the difference from the baseline value. For example, a driver of a new vehicle may wonder how many times the vehicle must be driven in order to calculate and display the baseline fuel economy and +/− trend, and the driver may suspect that such functionality and display may be malfunctioning and/or defective.

However, the fuel economy +/− trend may be more quickly displayed after using the vehicle, for example, by a method that averages the driver-specific fuel economy from all previous trips (i.e., driving events) to calculate the baseline fuel economy.

However, such a method of calculating the baseline value may be prone to large value fluctuations due to the small sample size. That is, when a vehicle is first used, the baseline fuel economy used to show +/− trends may largely fluctuate based on the small sample size, i.e., small number of previous trips used to calculate the baseline. In other words, the weight of each sampled value used to calculate the baseline value may be very large and this in turn may result in the display of +/− trends that largely differ from one driving instance (i.e., trip) to another. As such, the driver may be misled by large fluctuations in the fuel economy trends.

SUMMARY

It is an object of the present disclosure to provide a display controller that quickly displays a fuel economy performance value in the early stages of vehicle use while minimizing fluctuations in fuel economy baseline values used to calculate the performance value.

In one embodiment of the present disclosure, the drive controller includes: a first calculator, a second calculator, a display performer, at least one memory, and an updater.

The first calculator may calculate a driver-specific fuel economy value based on a specific vehicle performance value measured during vehicle operation. The second calculator may calculate a fuel economy performance value (i.e., improvement/decline) indicative of how much better/worse the driver-specific fuel economy value is relative to a baseline value, where the baseline value may be an average of the previous driver-specific fuel economy values for each trip.

The display performer controls a display device to display the fuel economy performance value.

The memory is capable of storing a plurality of driver-related fuel economy values, i.e., as "N" pieces of data, where N is an integer value. The memory sets an initial value for each of the plurality of the driver-related fuel economy values before the first calculator calculates the driver-related fuel economy values. The updater updates the driver-related fuel economy value by replacing the oldest driver-related fuel economy value stored in the at least one memory with a newly calculated driver-related fuel economy value. The second calculator calculates the fuel economy performance value based on the baseline value calculated as the average of the driver-related fuel economy values and initial fuel economy values stored in the at least one memory.

The display controller uses the memory to store the initial values of the driver-related fuel economy values in N number of pieces before storing the calculated driver-related fuel economy values.

The second calculator is configured to calculate the baseline value immediately after the driver-related fuel economy value is calculated by the first calculator. The second calculator is also configured to calculate the fuel economy performance value based on the baseline value. In such manner, the fuel economy performance value is displayable in the early stages of vehicle operation. Thus, instead of waiting to calculate driver-related fuel economy values for all N pieces of driver-related fuel economy data stored in memory, the display controller may use initial values to display the fuel economy performance value to keep a driver apprised of improvements and declines in the vehicle's fuel economy.

The baseline value is calculated as the average of N pieces of driver-related fuel economy data. For example, N may be 50 where the baseline value is calculated from 50 pieces of data. The weight of each driver-related fuel economy value calculated by the first calculator is 1/N. In such manner, fluctuations to the baseline value may be limited. By limiting the fluctuations of the baseline value, the fuel economy performance value is more accurately calculated and the driver is better informed of improvements and declines in the vehicle's fuel economy.

BRIEF DESCRIPTION OF THE DRAWINGS

Objects, features, and advantages of the present disclosure will become more apparent from the following detailed description made with reference to the accompanying drawings, in which:

FIG. 8A illustrates a comparative example of fuel economy calculation;
FIG. 8B illustrates a comparative example of fuel economy calculation;
FIG. 9A illustrates an initial value setting;
FIG. 9B illustrates an initial value setting.

DETAILED DESCRIPTION

The embodiments disclosed herein are described with reference to the drawings.

1. First Embodiment

[1-1. Configuration]

Figure 1:
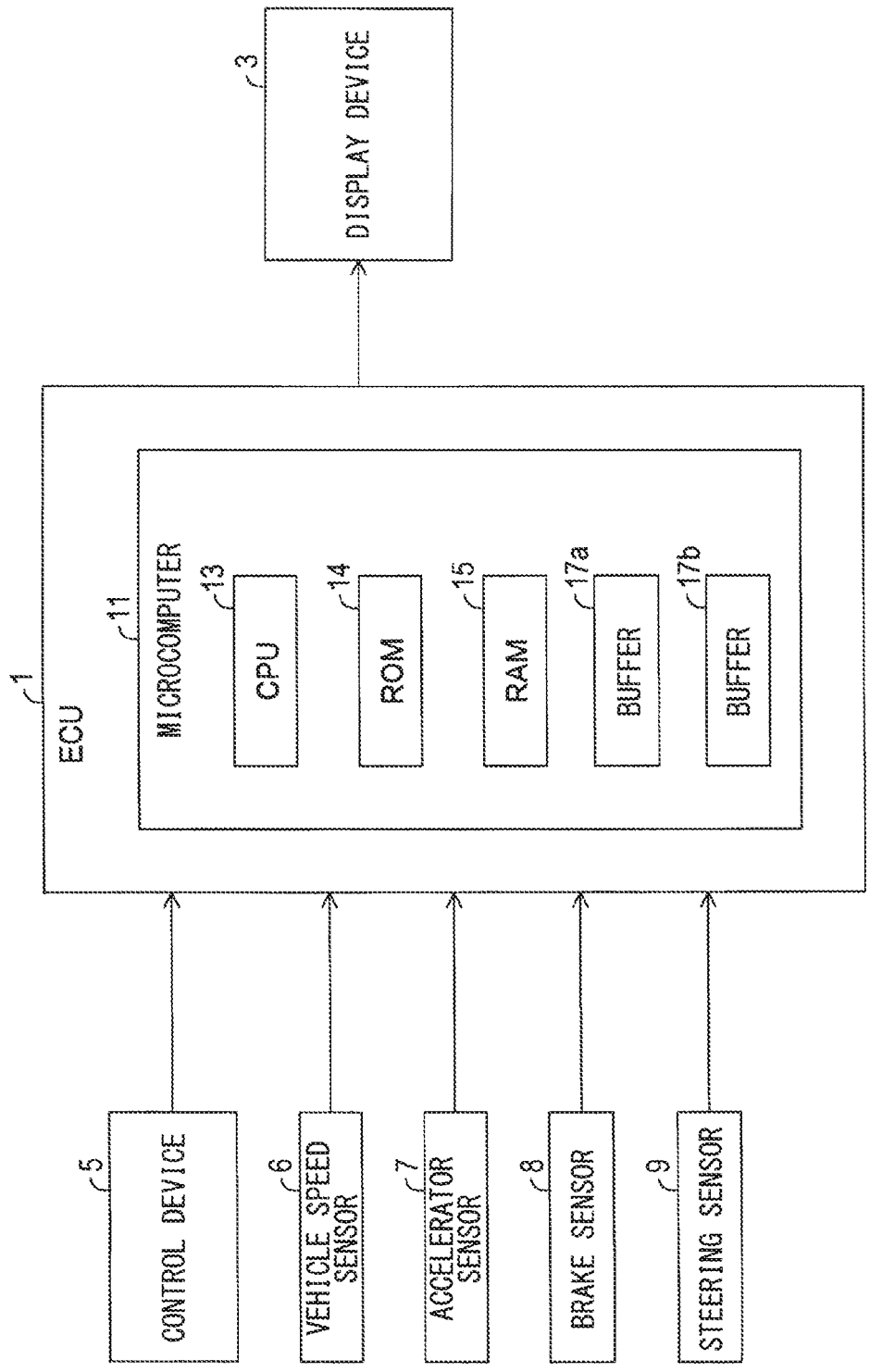
FIG. 1 illustrates a block diagram of a display controller.

With reference to FIG. 1, an electronic control unit (ECU) 1 may be configured as a display controller and disposed in a vehicle (not shown). The vehicle has an engine disposed therein as a source of power for propelling the vehicle. While a fuel powered engine may be used as the driving source, an electric motor may also be used. In such case, a performance index of an electric motor, such as power consumption per distance may be used in place of the fuel economy value. For example, kilowatt hour/mile (kWh/mi) or kilowatt hour/kilometer (kWh/km).

A display device 3 for displaying an image is connected to the ECU 1. The display device 3 may be a liquid crystal display, an organic electroluminescence display, or the like device.

Other devices such as a control device 5, a vehicle speed sensor 6, an accelerator sensor 7, a brake sensor 8, and a steering wheel sensor 9 may be connected to the ECU 1.

The control device 5 may control an injection of fuel to the engine of the vehicle. The control device 5 may output fuel information regarding an amount of fuel supplied to the engine to the ECU 1. The ECU 1 calculates an amount of fuel consumed by the engine, i.e., a fuel consumption amount, based on the fuel information from the control device 5. The vehicle speed sensor 6 outputs pulses at preset distances when the vehicle is traveling. The ECU 1 calculates a travel distance of the vehicle based on the pulses from the vehicle speed sensor 6. That is, when the vehicle is moving, the vehicle speed sensor 6 outputs a pulse when the vehicle travels a predetermined distance and the ECU 1 may use pulses from the vehicle speed sensor 6 to calculate the distance traveled by the vehicle. The accelerator sensor 7 outputs a signal to the ECU 1 to indicate the operation of an accelerator pedal by the driver. The brake sensor 8 outputs a signal to the ECU 1 to indicate the operation of the brake pedal by the driver. The steering wheel sensor 9 outputs a signal to the ECU 1 to indicate the operation of the steering wheel by the driver.

The ECU 1 is provided with a microcomputer 11 that manages and controls the operation of the ECU 1. The microcomputer 11 may include a CPU 13 that executes a program, a ROM 14, and a RAM 15.

Various processes performed by the microcomputer 11 may be realized by the program stored in a non-transitive, substantive storage medium and executed by the CPU 13. For example, the ROM 14 is a non-transitive, substantive storage medium for storing the program. Methods corresponding to the program may be performed by executing the stored program. The number of the microcomputers 11 in the ECU 1 may be one, two, or more. The functionality of microcomputer 11, either in part or as a whole, may be realized by using one hardware device, or by using two or more hardware devices. For example, when the functionality is realized by an electric circuit (i.e., by hardware), the electric circuit may be realized by a digital or analog circuit including logic circuits, or may be realized by a combination of digital and analog circuits.

The microcomputer 11 may also include at least two buffers 17$a$ and 17$b$. The buffers 17$a$ and 17$b$ may also be referred to as "memory." The buffer 17$a$ may be used to store driver-related fuel economy data and values for a main or primary driver of the vehicle who drives the vehicle most frequently. The buffer 17$b$ may stores the driver-related fuel economy data and values for secondary drivers of the vehicle who drive the vehicle less frequently than the main driver.

The driver-related fuel economy value is an index indicating the fuel economy of the based on the driving by a specific driver. The value of the fuel economy is one of the various vehicle performance indexes that may change from driver to driver. The driver-related fuel economy value is stored in the buffers 17$a$ and 17$b$. The buffers 17$a$ and 17$b$ may be referred to collectively as a buffer 17.

[1-2. Explanation of Buffer]

Figure 2:
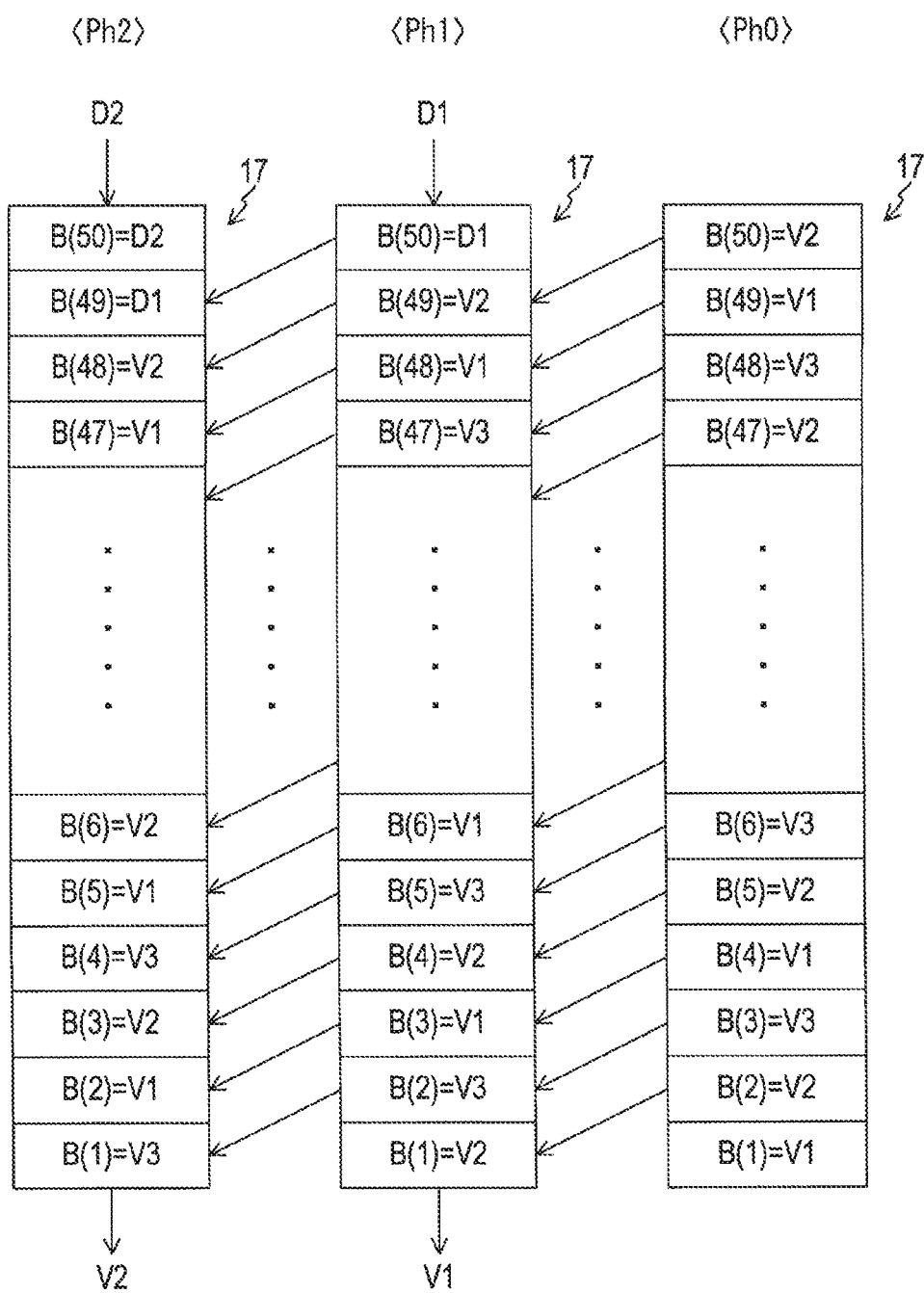
FIG. 2 illustrates a buffer.

The buffer 17 is a First-In First-Out or "FIFO" buffer. The buffer 17 may be provided with N numbers of storage areas, meaning that the buffer 17 may have more than one storage area. N is a preset integer that corresponds to the total number of initial values and calculated driver-related fuel economy values that may be saved in the buffer 17. That is, N represents a fixed/preset number of samples, for calculating a fuel economy performance value based on of the sampled fuel mileage values. For example, when "N=50", the buffer 17 may be provided with 50 storage areas B(1)-B(50), as shown in FIG. 2. Assuming that m is one of integer numbers between 1 and 50, B(m) means the m-th storage area among 50 areas. Data is stored in the storage area of the buffer 17 in an ascending order of storage area B(m), that is, B(1), B(2), B(3) . . . B(m) . . . B(50). The storage areas B(1)-B(50) may be collectively referred to as the storage area B.

With reference to FIG. 2, as shown by a column <Ph0> on the right-hand side of FIG. 2, initial fuel economy values, i.e., V1, V2, V3, may be stored in each of the storage areas B of the buffer 17. For example, the initial fuel economy values may be stored in the storage areas B of the buffer 17 during the manufacture of the vehicle, that is, before the vehicle leaves the factory and is used by a driver. The initial fuel economy value may be referred to simply as an "initial value."

The fuel economy value is an index or an indicator indicating a distance traveled by the vehicle per unit amount of fuel and indicated, for example, in units such as miles per gallon (mpg) or "km/L" where "km" is a kilometer and "L" is a liter. The fuel economy value may also be an index expressed in terms of a preset distance showing how much fuel is used to travel the preset distance, for example, "L/100 km," where the preset distance is 100 kilometers.

The initial fuel economy values stored in the buffer 17 may be values that do not exceed the best fuel economy that may be obtained by the vehicle. The initial value may be one kind of value, or may be two or more kind of values.

Three kinds of initial values V1, V2, and V3 are stored in the buffer 17, as a total of 50 values.

As shown by the column <Ph0> in FIG. 2, the initial values V1, V2, and V3 are stored in the storage areas B of buffer 17 in a repetitive order. Following the FIFO storage method, initial value V1 is stored in storage area B(1), V2 at B(2), V3 at B(3), and so on in a repetitive manner. Although the example shown in FIG. 2 has an order of "V1→V2→V3" arranged in succession, the order may be for example, "V1→V3→V2," that is, not necessarily arranged to repeat in succession.

When the vehicle leaves the factory with 50 initial values stored in the storage areas B of the buffer 17, when a driver first drives the vehicle, a new driver-related fuel economy value "D1" is calculated during the first trip of the vehicle and stored in the buffer 17. As shown in FIG. 2, the buffer 17 transitions from the state shown in column <Ph0> to the state shown in column <Ph1>, i.e., from the right-hand side column state to the center column state. Following the FIFO method, when new driver-related fuel economy value D1 is added or enqueued to buffer 17, the value D1 is stored in the storage area B(50) and the V1 value stored in storage area B(1) is shifted or dequeued out of the buffer 17. The remaining values stored in storage locations B(m) in column <Ph0> are shifted to storage locations B(m−1) having the next lowest integer value m−1 in column <Ph1>. That is, the data stored in the storage areas B(2)-B(50) are moved to the storage areas B(1)-B(49), respectively. Then, the new fuel mileage value D1 is stored in the storage area B(50) at the tail end of the series of storage areas.

After the fuel mileage value D1 is stored in storage area B(50), when a subsequent fuel mileage value D2 to be stored in the buffer 17 is calculated, the buffer 17 transitions from the state shown in column <Ph1> to the state shown in column <Ph2>, i.e., from the center column state to the left-hand side column state in FIG. 2. That is, the data stored in the storage areas B(2)-B(50) in column <Ph1> are respectively moved to the storage areas B(1)-B(49) in column <Ph2>. Then, the new fuel mileage value D2 is stored in the storage area B(50) at the tail end of the series of storage areas.

[1-3. Explanation of Displayed Screen on Display Device]

Figure 3B:
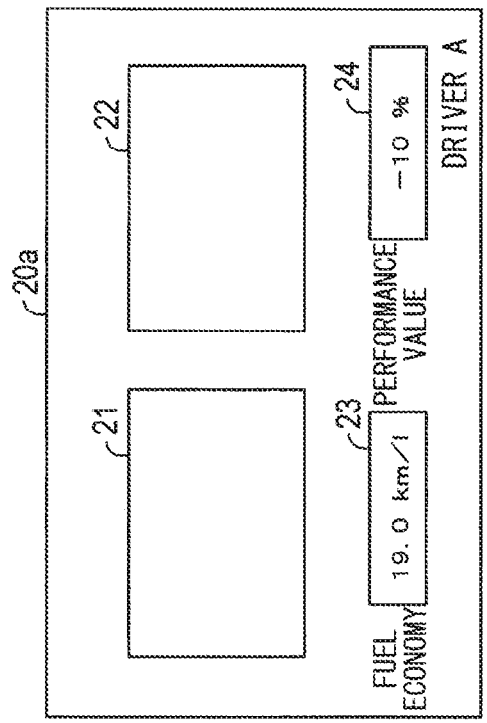
FIG. 3B illustrates a driver screen.
Figure 3A:
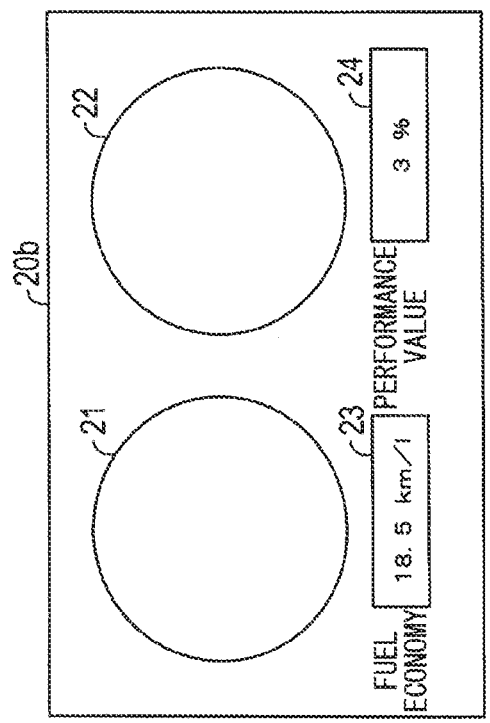
FIG. 3A illustrates a default screen.

As shown in FIGS. 3A and 3B, a driver screen 20a and a default screen 20b may be interchangeably displayed on the display device 3 to display the vehicle speed, engine rpm, etc. The driver screen 20a shown in FIG. 3B is a screen for the main or primary driver of the vehicle. The default screen 20b shown in FIG. 3A is a screen that may be displayed when a secondary driver (i.e., a driver other than the primary driver) uses the vehicle.

The driver screen 20a and the default screen 20b both display a first field 21 where the vehicle speed is displayed, a second field 22 where engine rpm is displayed, a third field 23 where the driver-related fuel economy value is displayed, and a fourth field 24 where a fuel economy performance value or simply "performance value" is displayed. The shapes of the first field 21 and the second field 22 differ between the driver screen 20a and the default screen 20b. In FIG. 3B, "DRIVER A" displayed in the lower right corner of the driver screen 20a may be a name for identifying the primary driver by using a driver's name, nickname, and the like.

The performance value displayed in the fourth field 24 is an index showing how the vehicle's fuel economy based on the driver or driver-related fuel economy compares to the baseline fuel economy or baseline value, where the baseline value is an average the driver-related fuel economies measured during each trip or drive event of the vehicle.

A performance value is represented by the following equation 1 in the present embodiment. The performance value is represented as a percentage "%."

$$\text{The performance value} = \{(\text{driver-related fuel economy} - \text{baseline value})/\text{baseline value}\} \times 100 \qquad \text{Equation 1}$$

That is, the performance value is a ratio of the difference between the calculated driver-related fuel economy and the baseline value divided by the baseline value, expressed as a percentage.

When a minimum resolution of the performance value to be displayed is designated as MR, the number of driver-related fuel economy values N is set to satisfy the following equation 2.

$$N = (1/MR) \times (\tfrac{1}{2}) \qquad \text{Equation 2}$$

Assuming that MR is 1%, i.e., "MR=0.01", "N=50" satisfies the equation.

[1-4. Processing]

The processing performed by the microcomputer 11 is described in the flowcharts shown in FIGS. 4, 5, 6, and 7.

Figure 4:
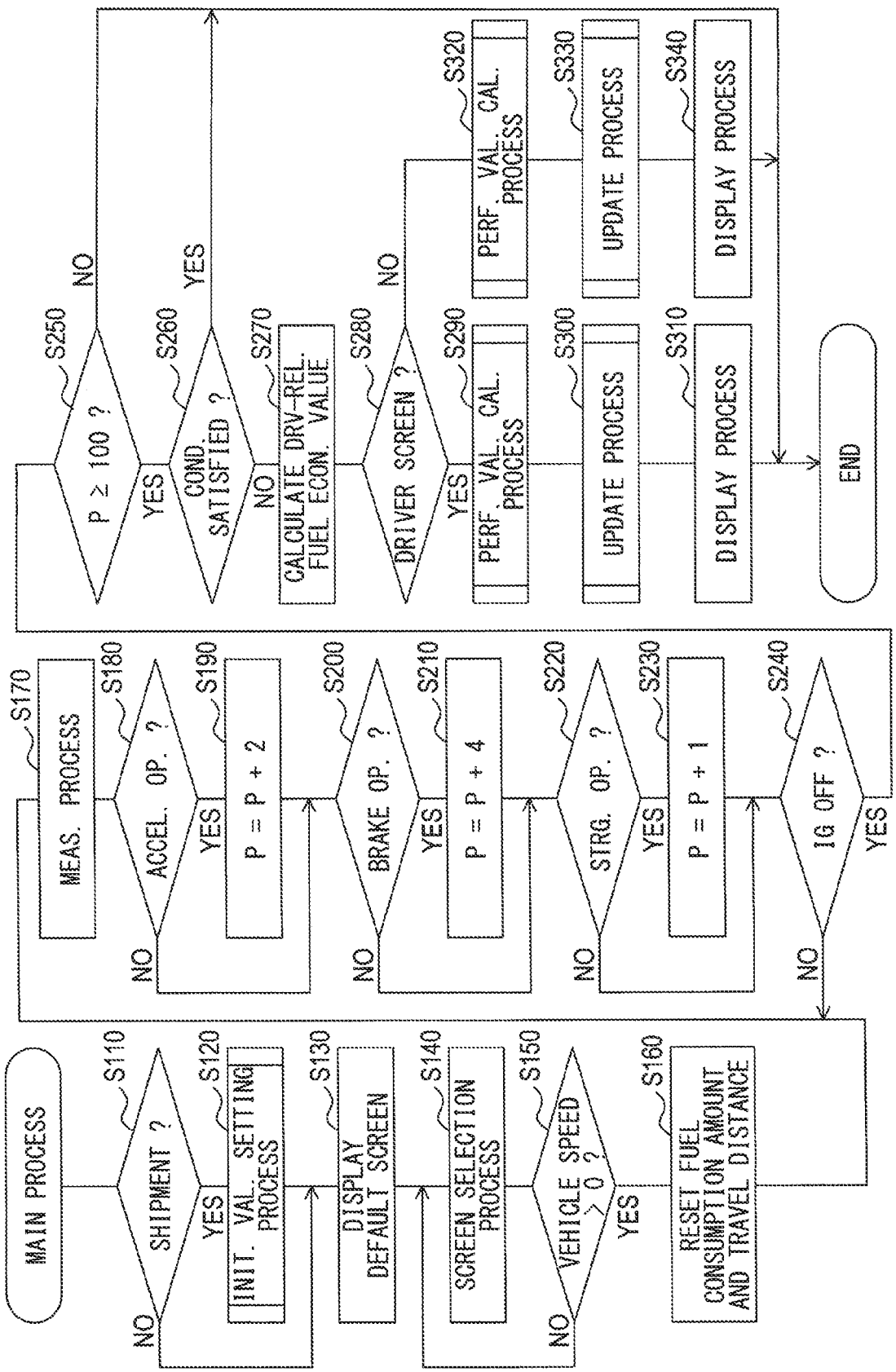
FIG. 4 is a flowchart of a main process.

With reference to FIG. 4, the microcomputer 11 performs a main process when the vehicle transitions from an ignition-off state to an ignition-on state.

As shown in FIG. 4, when the main process begins, the microcomputer 11 determines whether the vehicle is ready to be shipped from the vehicle assembly plant or production facility at S110.

For example, in the vehicle assembly plant, after the vehicle is assembled, a final inspection is performed before the vehicle is shipped. At S110, the microcomputer 11 determines whether test equipment for performing the final inspection is connected to the ECU 1. When the microcomputer 11 determines that test equipment is connected to the ECU 1, i.e., YES at S110, the microcomputer determines that the vehicle is ready to be shipped from the vehicle assembly plant.

Figure 5:
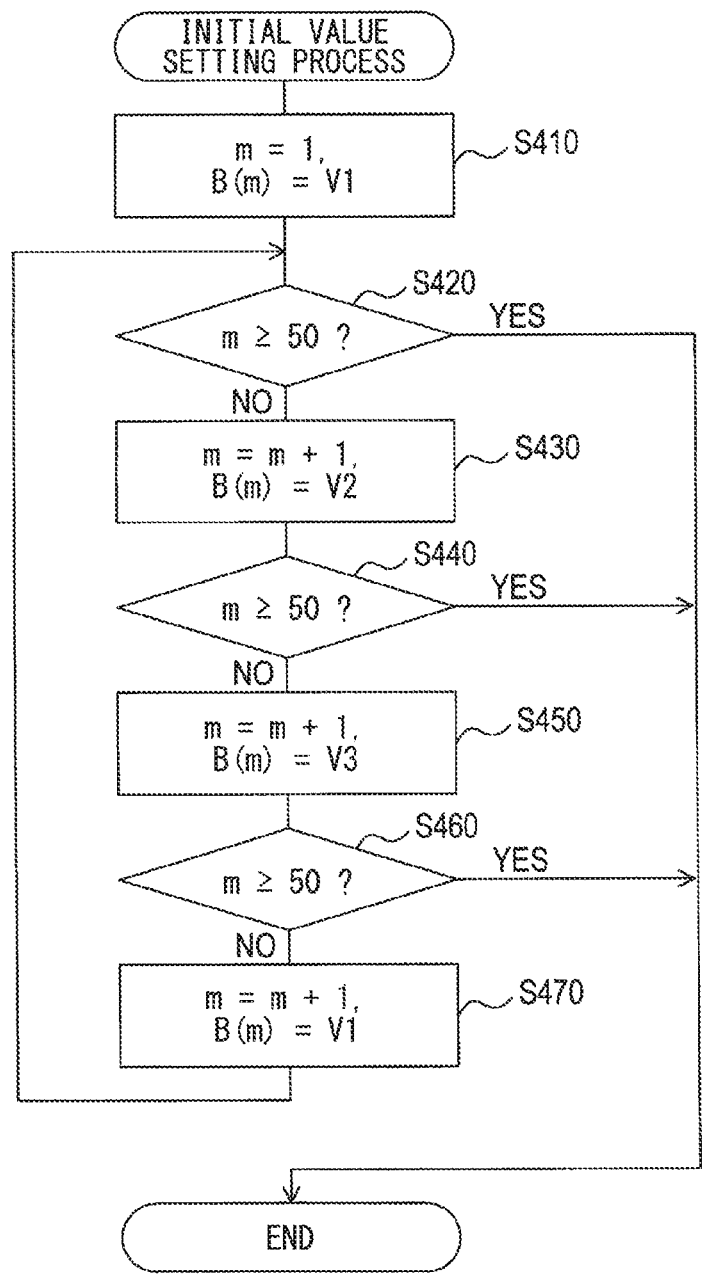
FIG. 5 is a flowchart of an initial value setting process.

When the microcomputer 11 determines that the vehicle is ready for shipment, the process proceeds to S120 and performs an initial value setting process shown in FIG. 5.

The Initial value setting process in FIG. 5 is for the process of storing the initial values V1-V3 to each of the buffers 17a and 17b. The initial value setting process of FIG. 5 is performed for each of the buffers 17a and 17b. The initial value setting process described with reference to FIG. 5 does not distinguish between the buffers 17a and 17b, but rather collectively describes the buffers 17a and 17b as buffer 17.

As shown in FIG. 5, at S410, the microcomputer 11 sets m to 1, to designate the storage area B(1) in the buffer 17 when the initial value setting process is started. The microcomputer 11 stores the first kind of the initial value, i.e., V1, to the storage area B(m) in the buffer 17, that is for example, the microcomputer 11 stores the initial value V1 to the storage area B(1).

At S420, the microcomputer 11 then determines whether variable m is equal to or greater than 50. When m is not greater than or equal to 50, i.e., NO at S420, the process proceeds to S430.

At S430, the microcomputer 11 stores the second kind of initial value, i.e., V2, to the storage area B(m) in the buffer 17 after incrementing m by a value of "1," i.e., m+1. In this example, B(1+1) or B(2)=V2.

At S440, the microcomputer 11 determines whether the new, incremented value of m is equal to or greater than 50. When m is not greater than or equal to 50, i.e., NO at S440, the process proceeds to S450.

At S450, the microcomputer 11 stores the third kind of initial value, i.e., V3, to the storage area B(m) in the buffer 17 after incrementing m.

The microcomputer 11 determines at S460 whether m is equal to or greater than 50. When m is not greater than or equal to 50, i.e., NO at S460, the process proceeds to S470.

At S470, the microcomputer 11 stores the first kind of initial value, i.e., V1 to the storage area B(m) in the buffer 17 after incrementing m.

Then, the process returns to S420.

The microcomputer 11 ends the initial value setting process when m is greater than 50 at S420, S440, or S460.

By performing the initial value setting process shown in FIG. 5, 50 initial values are stored in the buffer 17, for example, as shown by the column of <Ph0> in FIG. 2. The 50 initial values stored in the buffer 17 include three kinds of initial values V1, V2, and V3. The three kinds of initial values V1, V2, and V3 are arranged in an order of "V1→V2→V3", and such order is repeated.

With reference again to FIG. 4, the microcomputer 11 proceeds to S130 after ending the initial value setting process at S120. The microcomputer 11 also proceeds to S130 when it determines that that the vehicle has already been shipped from the factory or assembly facility at S110.

At S130, the microcomputer 11 displays the default screen 20b shown in FIG. 3 on the display device 3.

At S140, the microcomputer 11 performs a screen selection process. The screen selection process is processing that switches the screen displayed on the display device 3 to the default screen 20b or to the driver screen 20a based on a driver input to the display device 3. For example, the display surface of the display device 3 may be a touch panel (i.e., a touch type input device) used by a driver to select a screen. A driver may also input a screen selection through a mechanical switch or the like.

At S150, the microcomputer 11 determines whether the vehicle speed is greater than 0. When the vehicle speed is not greater than 0 (i.e., when the vehicle speed is equal to 0), i.e., NO at S150, the process returns to S140.

When the vehicle speed is greater than 0, i.e., YES at S150, the process proceeds to S160. A vehicle speed greater than 0 indicates that the vehicle has started to move or travel.

At S160, the microcomputer 11 resets both the amount of fuel consumed fuel and the distance traveled by the vehicle to 0. The amount of fuel consumed by the vehicle and distance traveled by the vehicle are values measured by the microcomputer 11 to calculate the fuel economy of the vehicle.

At S170, the microcomputer 11 performs a measurement process for measuring the amount of fuel consumed and the distance traveled. In the measurement process, the microcomputer 11 integrates the amount of fuel consumed based on the information from the control device 5, and calculates the distance traveled based on the pulse from the speed sensor 6. Here, the microcomputer 11 serves as a first calculator by taking the measurements and making the calculations at S170, that is, the processes performed at S170 are processes performed by the first calculator.

At S180, the microcomputer 11 determines whether the accelerator is being operated based on the signal from the accelerator sensor 7. When the microcomputer 11 determines that the accelerator is being operated, i.e., YES at S180, the microcomputer 11 adds a value of "2" to an operation assessment value P at S190.

The operation assessment value P is compared against a threshold value to determine whether a minimum number of operations have been performed by the driver before beginning the driver-related fuel economy and performance value calculations. By ensuring that a minimum number of operations have been performed by the driver, the fuel economy may be more accurately calculated. The accelerator, the brake pedal, and the steering wheel are all operation units that may be operated by the driver with each having a corresponding operation assessment value P. An initialization process (not shown), sets the operation assessment value P to 0 (zero) before the main process is started. Each time a driver operates the accelerator, the microcomputer 11 increases the operation assessment value P1 by a value of 2 at S190. That is, each time the accelerator is operated, a value of 2 is added to the operation assessment value P1.

At S180, when the microcomputer 11 determines that the accelerator is not being operated, i.e. NO at S180, or at the completion of the process at S190, the process proceeds to S200.

At S200, the microcomputer 11 determines whether the brake pedal is operated based on a signal from the brake sensor 8. When the microcomputer 11 determines that the brake pedal is operated, i.e., YES at S200, the microcomputer 11 adds a value of "4" to the operation assessment value P at S210. Each time a driver operates the brake pedal, the microcomputer 11 increases the operation assessment value P1 by a value of 4 at S210. That is, each time the brake pedal is operated, 4 is added to the operation assessment value P1.

At S200, when the microcomputer 11 determines that the brake pedal is not being operated, i.e., NO at S200, or after completing the process at S210, the microcomputer 11 performs the process at S220.

At S220, the microcomputer 11 determines whether the steering wheel is being operated based on the signal from the steering wheel sensor 9. When the microcontroller 11 determines that the steering wheel is being operated, i.e., YES at S220, the microcomputer 11 adds a value of "1" to the operation assessment value P at S230. Each time a driver operates the steering wheel, the microcomputer 11 increases the operation assessment value P1 by a value of 1 at S230. That is, each time the steering wheel is operated, 1 is added to the operation assessment value P1. The determination of whether the steering wheel is operated at S220 is based on whether the steering wheel moves from a neutral position.

At S220, when the microcomputer 11 determines that the steering wheel is not being operated, i.e., NO at S220, or after completing the process at S230, the microcomputer 11 performs the process at S240.

At S240, the microcomputer 11 determines whether the vehicle has transitioned to the ignition-off state. When it is determined that the vehicle has not transitioned to the ignition-off state, i.e., NO at S240, the process returns to S170. That is, after S230, if the microcomputer 11 determines that the vehicle ignition remains in the on state, the process returns to S170 and repeats. As shown in FIG. 4 at S240, "IG" is an abbreviation for an ignition.

At S240, when the microcomputer 11 determines that the vehicle has transitioned to the ignition-off state, i.e., YES at S240, the microcomputer 11 proceeds to S250 and determines whether the operation assessment value P is equal to or greater than a predetermined value. The operation assessment value P determined at S250 is a count value during a period from when the vehicle begins to travel in the ignition-on state to the end of such travel, i.e., a trip. When the trip or travel period of the vehicle ends and the ignition is switched to the ignition-off state, the microcomputer 11 calculates the count value accumulated during the travel period or trip, as determined at S180-S230. In this example, the predetermined value is assumed to be 100, as indicated at S250 in FIG. 4. However, 100 is an exemplary value and the predetermined value may be a value other than 100.

Here, when the microcomputer 11 determines the operation assessment value P at S180-S230 or compares the operation assessment value P against a predetermined threshold value at S250, the microcomputer serves as an operation determiner, that is, the processes performed at S180-S230 and at S250 are performed by the operation determiner.

When the microcomputer 11 determines that the operation assessment value P is equal to or greater than the predetermined value, i.e., YES at S250, the process proceeds to S260.

At S260, the microcomputer 11 determines whether certain conditions or factors exists that may influence or affects the fuel economy value when fuel consumption and travel distance measurements are taken at S170. Here, the microcomputer 11 serves as the first calculator to perform the determination process at S260, that is, the processes performed at S260 are performed by the first calculator.

Certain conditions and factors may include the time of day and weather conditions, for example, whether it is night time, whether it is raining, or the like. Various vehicle sensors may be used to determine such conditions and factors. For example, a headlight sensor may be used to sense whether a vehicle's headlights are in operation and used to determine the time of day, i.e., headlights in an on state may mean it is night time. A windshield wiper sensor may sense whether a vehicle's wipers are in operation, for example, to determine whether it is raining. The certain conditions and factors are not limited to these two exemplary conditions but may include other conditions and factors. The microcomputer 11 may use one or more of these certain conditions and factors in determining whether the factors and conditions are satisfied at S260.

When the microcomputer 11 determines that the one or more certain conditions and factors are not satisfied at S260, i.e. NO at S260, the process proceeds to S270. At S270, the microcomputer 11 calculates the fuel economy based on the most recent travel event or trip of the vehicle. More specifically, the microcomputer 11 calculates the fuel economy value by dividing the distance traveled by the vehicle, as measured at S170, by the amount of fuel consumed, as measured at S170. The fuel economy value calculated at S270 corresponds to the current driver-related fuel economy. Here, the microcomputer 11 serves as the first calculator to perform fuel economy calculations at S270, that is, the processes performed at S270 are performed by the first calculator.

At S280, the microcomputer 11 determines which screen is currently being displayed on the display device 3. That is, the microcomputer 11 determines the "on-display" screen being displayed on the display device 3. When the microcomputer 11 determines that the on-display screen is the driver screen 20a, i.e., YES at S280, the microcomputer 11 determines that the current driver of the vehicle is the main driver, and the process proceeds to S290.

At S280, when the microcomputer 11 determines that the on-display screen is not the driver screen 20a, i.e., NO at S280, the on-display screen is the default screen 20b and the microcomputer 11 determines that the current driver of the vehicle is a secondary driver, and the process proceeds to S320. That is, the microcomputer 11 determines the current driver of the vehicle based on the screen displayed on the display device 3.

Here, the microcomputer 11 determining the driver of the vehicle at S280 serves as the driver determiner, that is, the process performed at S280 is performed by the driver determiner.

Figure 6:
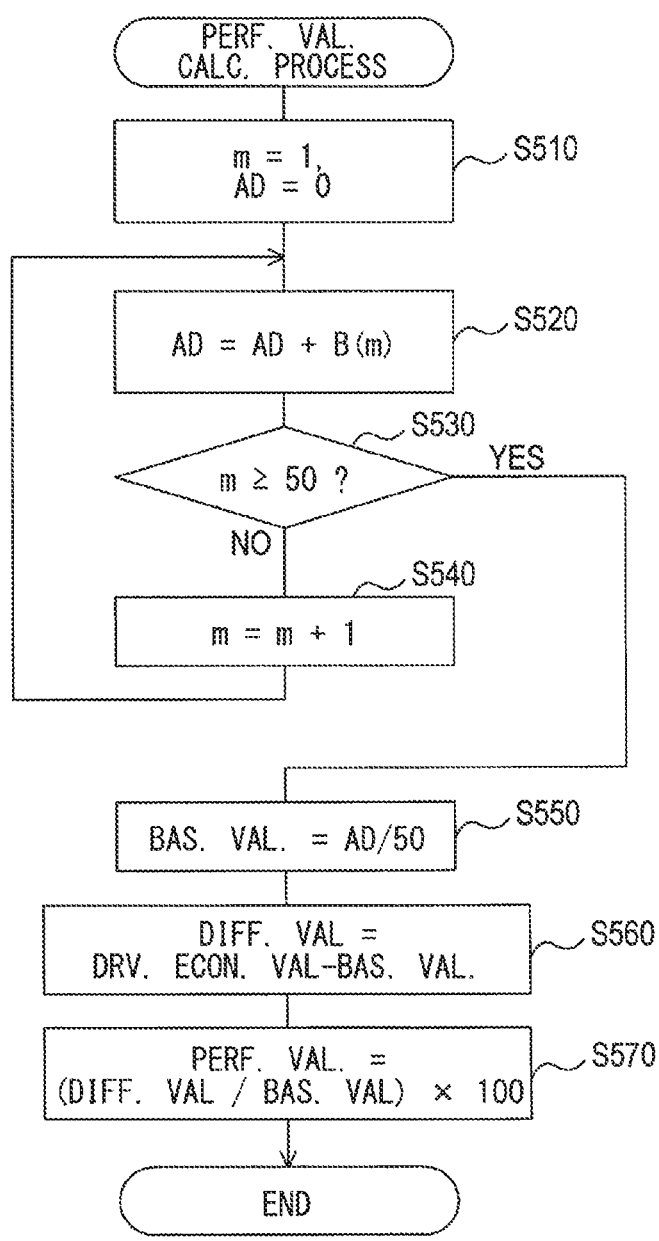
FIG. 6 is a flowchart of a performance value calculation process.

At S290, the microcomputer 11 calculates the performance value, for example, by using the process shown in FIG. 6, for the main driver. The microcomputer 11 selects the buffer 17a from among the buffers 17a and 17b to access fuel economy data and values corresponding to the main driver.

Likewise, at S320, the microcomputer 11 calculates the performance value using the exemplary process shown in FIG. 6 by selecting the buffer 17b from among the buffers 17a and 17b to access fuel economy data and values corresponding to the secondary driver of the vehicle.

The microcomputer 11 performing the processes at S290 and S320 serves as the second calculator, that is, the processes performed at S290 and S320 are performed by the second calculator.

The performance value calculation process of FIG. 6 calculates a performance value for the driver determined at S280 in FIG. 4. The performance value calculation is described without distinguishing between the buffers 17a and 17b, referring to buffers 17a and 17b collectively as the buffer 17. In other words, the exemplary performance value calculation process shown in FIG. 6 is the same, regardless of the driver and the corresponding buffer 17a or 17b associated with the driver.

As shown in FIG. 6, when the improvement amount calculation process is started, at S510 the microcomputer 11 sets m to a value of 1 to identify the storage area B in the buffer 17, for example, B(1). The microcomputer 11 also sets AD to zero. "AD" is a variable used to total the fuel economy data/values stored in the buffer 17. For example, AD is a variable used to total or sum the 50 fuel economy values stored in the buffer 17. The fuel economy values stored in the buffer 17 may also include the previously-described initial values loaded when the vehicle leaves the factory/assembly facility.

At S520, the microcomputer 11 reads a fuel economy value from a storage area B(m) on the buffer 17 and adds the fuel economy value read from the storage area B(m) to AD.

At S530, the microcomputer 11 determines whether m is equal to or greater than 50. When the microcomputer 11 determines that m is not equal to or greater than 50, i.e., NO at S530, the process proceeds to S540. At S540, the microcomputer 11 increments m by a value of 1, that is m=m+1, and the process returns to S520.

At S530, when the microcomputer 11 determines that m is equal to or greater than 50, i.e., YES at S530, the process proceeds to S550. When the process proceeds to S550, the value of AD is the total value, i.e., summation, of the 50 fuel economy values stored in the buffer 17.

At S550, the microcomputer 11 calculates a baseline value by dividing the value of AD by 50. That is, the microcomputer 11 calculates an average of 50 fuel economy values stored in the buffer 17 as the baseline value. The baseline value calculated at S550 is a baseline value of the driver-related fuel economy calculated at S270.

At S560, the microcomputer 11 calculates the difference value by subtracting the baseline value calculated at S550 from the driver-related fuel economy value calculated at S270. The difference value may represent a fuel economy performance value or may be used as the basis for calculating the performance value in terms of a percentage.

At S570, the microcomputer 11 calculates the fuel economy performance value for the driver determined by the process at S280 by substituting the difference value calculated at S560 and the standard value calculated at S550 into the following equation 3. Equation 3 is a simplified restatement of Equation 1. The microcomputer 11 then ends the performance value calculation process.

The fuel economy performance value=(Difference value/baseline value)×100   Equation 3

With reference again to FIG. 4, the process proceeds to S300 after the microcomputer 11 performs the performance value calculation process at S290. At S300, the microcomputer performs an update process shown in FIG. 7 by accessing the buffer 17a that corresponds to the main or primary driver from among the buffers 17a and 17b. Alternatively, after the microcomputer 11 calculates the performance value for the secondary driver at S320, the process proceeds to S330, and the microcomputer 11 performs the update process shown in FIG. 7 for the secondary driver by accessing the buffer 17b that corresponds to the secondary driver from among the buffers 17a and 17b.

Here, the microcomputer performing the update processes at S300 and S330 serves as an updater, that is, the processes performed at S300 and S330 are performed by the updater.

Figure 7:
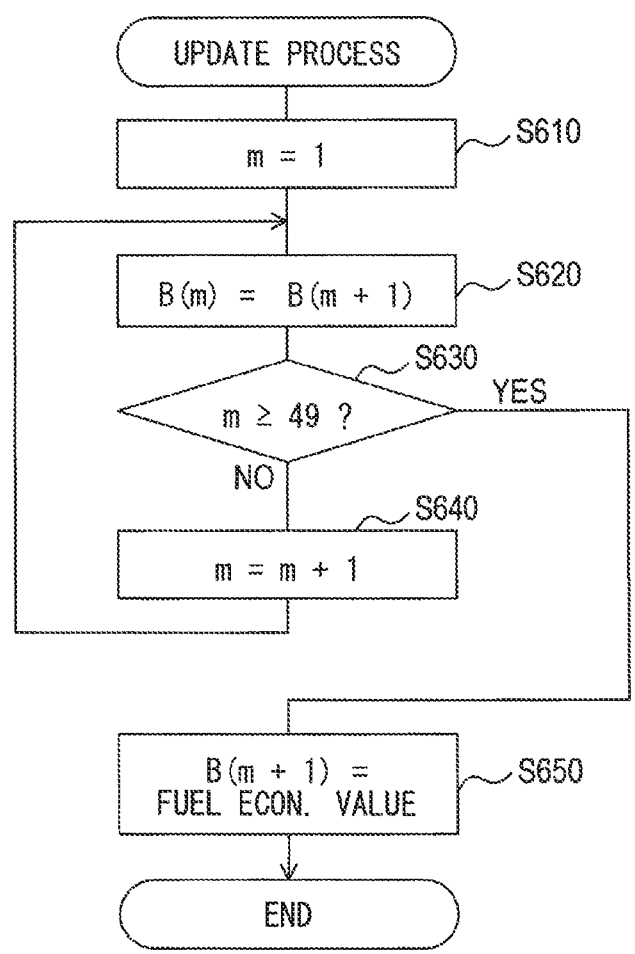
FIG. 7 is a flowchart of a baseline value update process.

The update process of FIG. 7 is a process for updating the fuel economy values stored in the buffer 17, that is, either the buffer 17a storing fuel economy values for the main driver or the buffer 17b storing fuel economy values for the secondary driver. The process shown in FIG. 7 is described, without distinguishing the buffers 17a and 17b, referring to the buffers 17a and 17b collectively as the buffer 17.

As shown in FIG. 7, when the update process is started at S610, the microcomputer 11 sets m to a value of 1. Again, m is used as a variable to identify a storage area B in the buffer 17, for example, B(1).

At S620, the microcomputer 11 reads the fuel economy value from the storage area B(m+1) in the buffer 17 and stores the read fuel mileage value to the storage area B(m).

At S630, the microcomputer 11 determines whether m is equal to or greater than 49. When the microcomputer 11 determines that m is not equal to or greater than 49, i.e., NO at S630, the microcomputer increments m by a value of 1, i.e., m=m+1, and the process returns to S620.

When the microcomputer 11 determines that m is equal to or greater than 49, i.e., YES at S630, the process proceeds to S650. After the buffer update process, the fuel economy values previously stored in the storage areas B(2)-B(50) are now stored in the storage areas B(1)-B(49) of the buffer 17. That is, the fuel mileage values stored in the storage area B(2)-B(50) are moved to the storage area B(1)-B(49) by the processes performed at S610-S640.

At S650, the microcomputer 11 stores the driver-related fuel economy value calculated at S270 to the storage area B(50) in the buffer 17, and the update process ends.

With reference again to FIG. 4, the process proceeds to S310 after the microcomputer 11 performs the update process at S300. At S310, the microcomputer 11 performs a display process to display information on the driver screen 20a. At S310, the microcomputer 11 displays the performance value calculated by the performance value calculation process of S290.

With reference again to FIG. 3B, the performance value is displayed in the field 24 of the driver screen 20a and the driver-related fuel economy value calculated at S270 is displayed in the field 23 of the driver screen 20a.

With reference again to FIG. 4, after the microcomputer 11 displays the primary driver-related information on the driver screen 20a at S310, the main process ends.

With regard to the secondary driver processes, after the microcomputer 11 performs the update process in S330, the process proceeds to S340, and the microcomputer 11 performs the display process for displaying secondary driver-related information on the default screen 20b. In the display process of S340, with reference to FIG. 3A, the microcomputer 11 displays the performance value calculated at S320 in the field 24 of the default screen 20b and displays the driver-related fuel economy value calculated at S270 in the third field 23 of the default screen 20b.

With reference again to FIG. 4, after the microcomputer 11 displays the secondary driver-related information on the driver screen 20b at S340, the main process ends.

Here, the microcomputer 11 performing the display processes of S310 and S340 serves as a display performer, that is, the processes performed at S310 and S340 are performed by the display performer.

The microcomputer 11 may end the main process at S250 and S260 without performing the processes at S270-S340, if the microcomputer 11 determines at S250 that the operation assessment value P is not equal to or greater than a predetermined value, or when the microcomputer 11 determines at S260 that a specific condition is satisfied.

[1-5. Explanation of Comparative Example]

Both the first and second comparative examples described below describe a conventional display controller other than the display controller described by various embodiments of the present disclosure

[1-5-1. First Comparative Example]

With conventional display controllers, a baseline value and performance value amount may not be displayed until the controller collects enough sample fuel economy data. For example, in the previously-described exemplary embodiment, the example sample size is 50 values used to calculate a driver-related baseline fuel economy and performance value. In conventional controllers, the controller may have to wait until all data for the sample size is collected before a driver-related baseline fuel economy and a performance value may be calculated and displayed.

As such, compared to the exemplary embodiment described above, a conventional controller would have to wait for a driver to complete 50 trips before a driver-related fuel economy value and performance value could be calculated and displayed. Therefore, the owner of a vehicle using a conventional controller may erroneously assume that such a conventional display controller of a vehicle is broken due to the amount of driving needed to fulfill the sample size for conventional controllers. In other words, with conventional controllers, a driver may not know how many trips must be completed before the driver-related fuel economy value and performance value are shown, and assume that the display is broken or malfunctioning.

[1-5-2. Second Comparative Example]

A second comparative example of the driver-related fuel economy, baseline, and performance value calculations made by a conventional display controller are shown with reference to FIGS. 8A and 8B. In the conventional display controller of the second comparative example, as shown in FIG. 8B, when a first fuel mileage value D1 is calculated by a conventional controller, both the difference between the driver-related fuel economy value and the baseline value and the performance value are calculated by using "0 (zero)" as the baseline value. Then, after the conventional controller calculates the fuel economy values D2-D50, the performance value is then calculated using the baseline value that is an average of the previously-collected fuel economy data. Assuming a sample size of 50 fuel economy values, it is only after 50 driving events or trips that the baseline value of a conventional controller is calculated using collected data instead of non-zero values, for example, as shown in FIG. 8A when fuel economy value D51 is used to calculate a performance value.

The second comparative example assumes a display controller that is capable of displaying a performance value after a first trip or driving event of a vehicle.

However, because the calculations of the conventional controller in the second comparative example do not include initial values, calculations made in the early stages that are only based on a few fuel economy samples may be heavily weighted causing a large amount of fluctuation to the baseline value.

As shown in FIG. 8B, the standard value shown by a dashed-dotted line, i.e., one-dot-one-dash line, changes by a greater degree due to the fluctuations of the calculated fuel economy values Dn, where "n" is an integer value equal to or greater than 1. Large fluctuations to the baseline value may cause large differences in performance values to be displayed, even in instances where a value of one fuel economy sample is the same as the previous sample. As such, the performance value calculated and displayed by the conventional controller in the second comparative example may not accurately reflect the true fuel economy and performance values.

In FIGS. 8A and 8B, the length of each of the vertical dotted line arrows represents the calculated performance value. A baseline value RS shown by the dotted line is the average already calculated and stored fuel economy values. In other words, the baseline value RS shown in FIGS. 8A and 8B represents a stable baseline value derived from fuel mileage values having sufficiently small weight. This example assumes that the stable baseline value RS is calculated from a preset sample size of 50 fuel economy values. Both FIGS. 8A and FIG. 8B illustrate fuel economy values that differ from the baseline value by the same amount in an alternating (i.e., up/down manner). That is, the absolute value of the difference between the fuel economy value and the baseline value, for each of the Dn samples in FIGS. 8A and 8B is the same. In FIG. 8B, each of diagonally-shaded portions illustrates the difference between the performance value relative to the fluctuating baseline value shown by the dashed-dotted line and the performance value calculated assuming that the baseline value is the stable baseline value RS.

As shown in FIG. 8B, the performance values largely differ among the second drive occasion, i.e. trip, and the fourth drive occasion even when the fuel economy value D2 and the fuel economy value D4 are the same. As such, the performance value displayed on a display device of the conventional display controller described in the second comparative example would also exhibit such large differences, thereby leading to possible confusion and misunderstanding by the driver. As such, even though a driver may have driven the vehicle in the same manner for each of the trips shown in D2 and D4 of FIG. 8B, different performance values are displayed.

[1-6. Effects of the First Embodiment]

In the ECU 1 of the present embodiment, before the driver-related fuel economy values are calculated at S270 of FIG. 4 and stored for the first time in the buffer 17, N number of initial fuel economy values are already stored in the buffer 17 by the initial value setting process.

On account of these initial fuel values, the performance value calculations calculated at S290 and S320 of FIG. 4, may be calculated right after the calculation of the first driver-related fuel economy value at S270 of FIG. 4, the baseline value may be calculated, and the performance value may be calculated using the baseline value. In such manner, the performance value may be calculated and displayed on the display device 3 after the first trip of the vehicle. That is, the display controller of the present disclosure can display a performance value without having to wait for N number of driver-related fuel economy values to be calculated.

The baseline value calculated by the processes of S510-S550 in FIG. 6 is an average of N numbers of fuel economy values. The N number of fuel economy values includes the initial fuel economy values. Therefore, the weight of each driver-related fuel economy value calculated at S270 of FIG. 4 for calculating the baseline value is "1/N." By weighting each of the N number of fuel economy values equally, fluctuations of the baseline value may be reduced. By reducing the fluctuations to the baseline value, a driver is provided with a more accurate performance value.

The initial values of the N numbers of fuel economy values stored in the buffer 17 are values that do not exceed the best fuel economy value that may be achieved by the vehicle. For example, the best fuel economy value may be the value stated on the window sticker of the vehicle, that is, the EPA fuel economy/environmental label on new vehicles, or a value published in the vehicle owner's manual.

By using such values for the initial values, the performance value displayed on the display device 3 is limited from taking extreme values during the period where the initial values in the buffer 17 are replaced with the driver-related fuel economy values calculated at S270 of FIG. 4.

While the initial value may be the fuel economy listed on the vehicle window sticker, that is, a theoretical value, the initial value may also be a fuel economy value actually calculated by the vehicle during a test drive of the vehicle.

When the initial values stored in the buffer 17 are two or more kinds of values, the two or more initial values may be different values. For example, the fuel economy of a vehicle may differ from one location or market to another based on different emissions standards or vehicle regulations used in each location. Vehicles may also be manufactured to have different fuel economies in different locations/markets. For example, vehicles manufactured for the Japanese market may produce different fuel economy values than vehicles manufactured for the American market. In this example, the initial values may reflect the different fuel economies of the vehicle in each location such that the fuel economies may be location-based. The two or more kinds of initial values may also be different fuel economy values measured during different test drives of the vehicle.

FIG. 9A illustrates a situation where three kinds of initial values V1, V2, and V3 stored in the buffer 17 are averaged, resulting in a value smaller than the previously-described stable baseline value RS. The stable baseline value RS corresponds to a baseline value calculated by driver-related fuel economy values. FIG. 9A illustrates a situation where the initial values V1, V2, are V3 are values respectively worse than the driver-related fuel economy. That is, V1, V2, and V3 are values worse than the fuel economies that result from the driver's driving. Thus, in FIG. 9A the baseline value for the first driving event, i.e., trip, is shown by a star. The baseline value shown by the star in FIG. 9A is less than the stable baseline value RS. As shown in FIG. 9A, a dashed-dotted line representing the baseline value as calculated using both initial values and measured values approaches the stable baseline value RS as the vehicle makes more and more trips, i.e., as the number of calculated driver-related fuel economy values increases.

FIG. 9B illustrates a situation where three kinds of initial values V1, V2, and V3 are averaged resulting in a value larger than the stable baseline value RS. FIG. 9B illustrates a situation where the initial values V1, V2, and V3 are values better than the fuel economy values calculated based on the driver's driving. Thus, in FIG. 9B, the baseline value for the first trip, as indicated by the star, is a value greater than the stable baseline value RS. As shown in FIG. 9B, the dashed-dotted line representing the baseline value as calculated using both initial values and measured values approaches the stable baseline value RS as the vehicle makes more and more trips, that is, as more and more driver-related fuel economy values are calculated.

The initial values V1, V2, and V3 may be values obtained during the test drive of the vehicle. FIGS. 9A and 9B illustrate a situation where the absolute value between each of the calculated fuel economy values and the stable baseline value RS is the same. In FIGS. 9A and 9B, each of the diagonally-shaded portions shows a difference between the performance value relative to the fluctuating baseline value shown by the dashed-dotted line and the performance value calculated where the baseline value is the stable baseline value RS.

As shown in the example of FIG. 9A, when the vehicle is new and has not been driven that much, i.e., a small number of trips, the baseline value calculated at S550 of FIG. 6 is smaller than the stable baseline value RS, and the difference between the baseline value and the stable baseline value RS is large. Therefore, even when the fuel economy value is the same in each of the drive occasions in the early stage, the performance value calculated in each of the vehicle trips becomes larger bit by bit. Then, as the baseline value approaches the stable baseline value RS based on the increase of vehicle trips, the calculated difference between the driver-related fuel economy value and the baseline value for each of the trips becomes smaller, even when the driver-related fuel economy value is the same for each trip. Therefore, the performance value displayed on the display device 3 also becomes smaller. For example, even when fuel economy values D5 and D7 that are calculated in the fifth vehicle trip and in the seventh vehicle trip are the same value, the calculated difference between fuel economy and baseline value i7 for the seventh trip is smaller than the difference calculated for the fifth trip i5. As such, a driver may wonder why the performance value does not improve.

On the other hand, in the example of FIG. 9B, in the early stage when the vehicle has made a relatively few number of trips, the baseline value calculated at S550 of FIG. 6 is greater than the stable baseline value RS, and the difference between the baseline value and the stable baseline value RS is large. Therefore, even when the fuel economy value is the same in the early stages, the difference value steadily decreases. Then, as the baseline value approaches the stable baseline value RS based on an increased number of vehicle trips, the difference value increases, even when the fuel economy value is the same for each of the vehicle's trips. Therefore, the performance value displayed on the display device 3 also becomes larger. For example, even when the fuel economy values D5 and D7 that are respectively calculated in the fifth trip and in the seventh trip are the same value, the difference value i7 is calculated in the seventh trip becomes greater than the difference value i5 calculated in the fifth trip. Therefore, the driver may more easily notice that the displayed performance value is getting better. Therefore, the effects devised by the ECU 1 may enhance the driving experience of the driver.

In view of the situation explained with reference to FIGS. 9A and 9B, the initial value stored in the buffer 17 may have a best possible value within a range that does not exceed the best fuel economy value that may be achieved by the vehicle. More practically, the initial value may be adjusted or set to the fuel economy value listed on the window sticker or in the owner's manual of the vehicle, to maximize the effects described with reference to FIG. 9B.

Figure 10:
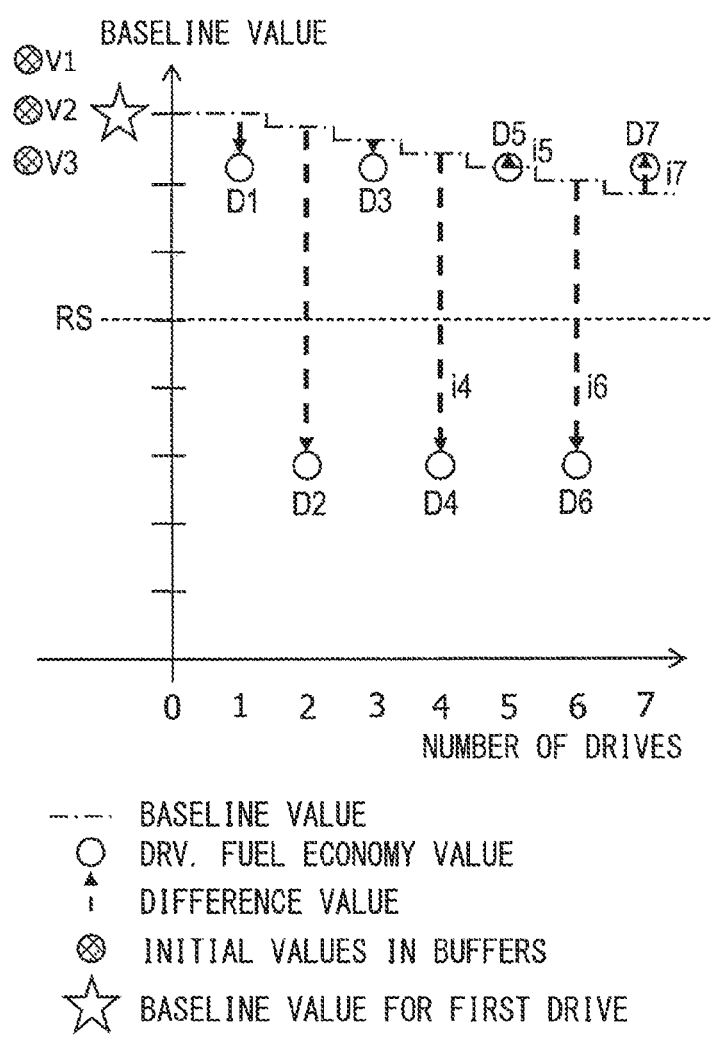
FIG. 10 illustrates an initial value setting using a predetermined fuel economy value.

In an example of FIG. 10, three kinds of initial values V1, V2, and V3 stored in the buffer 17 are respectively the fuel mileage values listed on/in the window stickers/owner's manual for vehicles distributed in three different markets.

For example, the initial value V1 is a fuel economy value listed for vehicles sold in Japan, the initial value V2 is a fuel economy value listed for vehicles sold in the United States, and the initial value V3 is a fuel economy value listed for vehicles sold in Canada.

In the example of FIG. 10, each of the initial values V1, V2, and V3 is a large value as compared with the example of FIG. 9B. What is more, the increase in value from the value at i5 to the value at i7, as shown in FIG. 10, is greater than the increase in value from i5 to i7 in FIG. 9B.

As shown in column <Ph0> of FIG. 2, each of the initial values V1, V2, and V3 are stored in the buffer 17 in a repetitive manner where the initial value of one storage area is different than the initial value stored in the successive and/or preceding storage area(s). As such, until a driver-related fuel economy as calculated at S270 in FIG. 4 replaces all of the initial values stored in the buffer 17, the influence of each of the three values V1, V2, and V3 is equal in terms of the effect on calculating the baseline value.

In contrast, where the initial values are not stored in a repetitive manner, but are rather stored repeatedly, the FIFO method used by the buffer 17 may skew the effect certain values have on calculating the baseline. That is, such an arrangement may give greater weight to the effect of one initial value over the other. For example, if initial value V1 is stored as the first 10 values in the buffer 17, i.e., in storage locations B(1)-B(10), initial value V2 is stored in the next 20 storage locations, i.e., B(11)-B(30), and initial value V3 is stored in the last 20 storage locations, i.e., B(31)-B(50), after calculating 10 driver-related fuel economy values, the initial value V1 is pushed out of the buffer 17. That is, V1 is no longer used to calculate the baseline value, giving greater weights to initial values V2 and V3. As previously described with reference to the comparative example of a conventional controller in FIG. 8B, giving greater weight to fuel economy values can result in inaccurate calculations and displays that may confuse a driver. In order to avoid such a situation, the repetitive arrangement of initial values, as shown in column <Ph0> of FIG. 2, may be desirable.

The microcomputer 11 ends the main process of FIG. 4 without calculating a fuel economy value when the microcomputer 11 determines that there is a certain condition or factor at S260 that may affect the fuel economy value calculation. As such, fuel economy values that occur during the occurrence of certain conditions or factors are excluded from the fuel economy calculations. By excluding such calculations influenced by factors and conditions having an effect on the fuel economy calculations, the microcomputer 11 limits any decline in the calculation accuracy of the driver-related fuel economy values, the baseline value, and the performance value.

During each vehicle trip, i.e., driving event, the microcomputer 11 counts the number of operations of at least one operation unit using the operation assessment value P. That is, each time an operation unit is operated by the driver, the microcomputer 11 may assign the operation with an operation assessment value P, as described by the processes at S180-S230 of the main process shown in FIG. 4. While these processes described the microcomputer 11 monitoring the operations of the accelerator, the brake pedal, or the steering wheel, the monitoring is not limited to these specific operation units or previously-described processes. For example, the microcomputer 11 may be configured to monitor only one of the previously-described operation units such as the accelerator pedal, or another device may be monitored, such as the operation of the turn signal.

When the operation assessment value P is equal to or greater than a predetermined value (e.g., 100), i.e. YES at S250, the microcomputer may calculate the driver-related fuel economy value at S270.

Thus, the microcomputer 11 may calculate the driver-related fuel economy value when there is some substantial amount of driving to limit any decline in the calculation accuracy of the driver-related fuel economy values, the baseline value, and the performance value.

The microcomputer 11 may determine whether the driver operating the vehicle is the primary driver at S280 of the main process shown in FIG. 4. Based on the driver determined at S280, the microcomputer selects the corresponding buffer, that is, buffer 17a or 17b, corresponding to the primary driver or secondary driver respectively, to calculate the baseline value and the performance value.

The update processes performed at both S300 and S330 of FIG. 4, may also be based on the vehicle driver, and the microcomputer 11 selects the corresponding buffer, i.e., buffer 17a or buffer 17b, depending on the vehicle driver to perform the update process. As such, the microcomputer 11 is configured to select an appropriate buffer 17a or 17b for storing calculated driver-related fuel economy values based on the vehicle driver determined at S280.

In such manner, the driver-related fuel economy values, the baseline value, and the performance value may be distinguishable between different drivers of the vehicle.

When there are three or more drivers of the vehicle, the microcomputer 11 may include three or more buffers to store driver-related fuel economy values used for calculating a baseline value and a performance value associated with each driver of the vehicle. That is, an additional hierarchy of primary, secondary, and tertiary drivers may be defined to distinguish among the drivers of a vehicle and assign corresponding buffers. Drivers of the vehicle may be distinguished based on driver input, for example, through a switch or other touch input, or by image recognition, for example, through an image of the driver captured by a camera or other imaging device and processed by image recognition software.

2. Second Embodiment

[2-1. Point of Difference from the First Embodiment]

The configuration of the second embodiment is similar to the first embodiment and like reference characters used to describe the second embodiment indicate the same structural components, processes, and the like, as described in the first embodiment, unless otherwise described, For the sake of brevity, the second embodiment is described indicating the differences from the first embodiment.

Figure 11B:
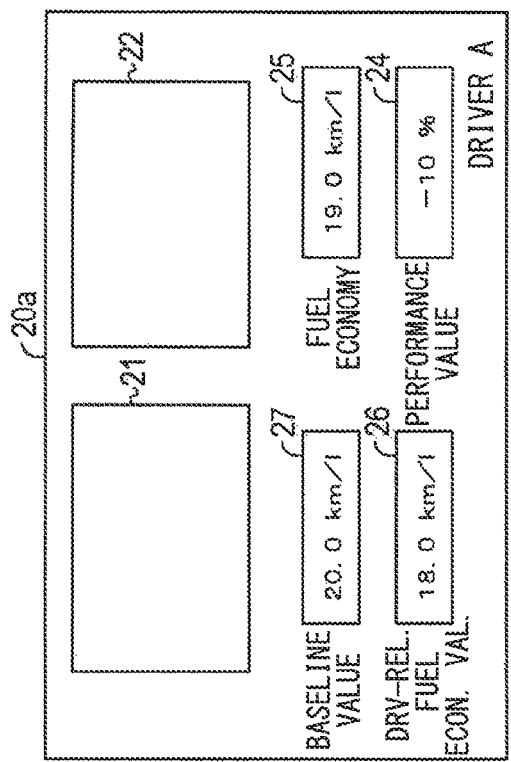
FIG. 11B illustrates a driver screen.
Figure 11A:
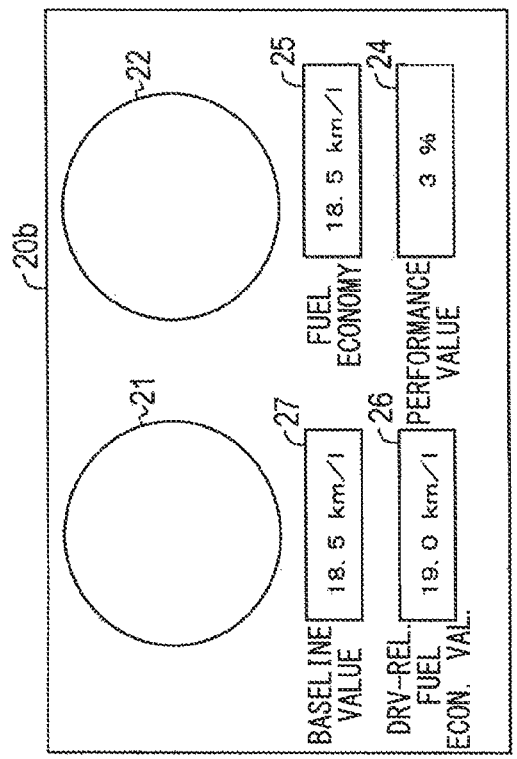
FIG. 11A illustrates a default screen.

As shown in FIGS. 11A and 11B, the driver screen 20a and the default screen 20b are not provided with the third field 23, and are provided with the fifth field 25, the sixth field 26, and the seventh field 27. That is, the driver screen 20a and default screen 20b shown in FIGS. 11A and 11B may omit certain fields and include additional fields other than those illustrated in FIGS. 3A and 3B.

In the second embodiment, the process described at S170 is modified to include that the microcomputer 11 determines whether there are certain conditions or factors that may influence the vehicle fuel economy calculation. In this modified process, the microcomputer 11 may take two sets of measurements. The microcomputer 11 may make a first set of measurements measuring the total amount of fuel consumed Ft and a total distance traveled Lt when the microcomputer 11 determines that there are no conditions or factors that may influence the vehicle fuel economy calculation. The microcomputer 11 may make a second set of measurements to measure the total amount of fuel consumed Fr and the total distance traveled Lr when the microcomputer 11 determines that there are certain factors and conditions affecting the vehicle fuel economy calculation.

In the second embodiment, the process at S160 of FIG. 4 is also modified to reset all the measurements of the modified process of S170. That is, the microcomputer 11 resets the total amount of fuel consumed Ft, total distance traveled Lt, the total amount of fuel consumed Fr, and the total distance traveled Lr.

In the second embodiment, the process performed at S260 in FIG. 4 may be omitted. That is, with reference to FIG. 4, in the modified main process of the second embodiment, the process may proceed from S250 to S270 when the microcomputer 11 determines that the operation assessment value P is greater than a predetermined level.

In the second embodiment, the process at S270 is modified so that the microcomputer 11 calculates the fuel economy value from the fuel consumption amounts Ft, Fr and the travel distances Lt, Lr measured at the modified S170 by using the following equation 4

Fuel economy value=$(Lt-Lr)/(Ft-Fr)$     Equation 4

"Lt−Lr" in equation 4 is the travel distance in case that the specific condition is not satisfied, and "Ft−Fr" in the equation 4 is the fuel consumption amount in case that the specific condition is not satisfied. That is, the fuel economy value calculated in S270 as the driver-related fuel economy value is a fuel economy value in instances where the certain condition is not satisfied during the current travel of the vehicle.

In the second embodiment, the performance value is calculated from the driver-related fuel economy value calculated at the modified process of S270 and at S560 of FIG. 6. At S650 of FIG. 7, the fuel mileage value calculated at S270 is stored in the storage area B(50) of the buffer 17.

In the modified process at S170 of FIG. 4, instead of measuring the fuel consumption amount Fr and the travel distance Lr, a fuel consumption amount Fs and a travel distance Ls in case where the certain condition is not satisfied may be measured. In such case, in S270 of FIG. 4, "Lt−Lr" and "Ft−Fr" in the equation 4 may be respectively replaced with the measured travel distance Ls and the measured fuel consumption amount Fs.

At S310 of FIG. 4, the microcomputer 11 calculates the total fuel economy value as the "vehicle fuel economy value" for the vehicle trip using the total fuel consumption amount Ft and the total travel distance Lt measured in the modified process at S170 using the following equation 5.

Vehicle fuel economy value=Lt/Ft  Equation 5

At S310 the microcomputer 11 displays information in fields 24, 25, 26, and 27 of the driver screen 20a.

The performance value calculated by the performance value calculation process performed at S290 of FIG. 4 is displayed in the fourth field 24.

The vehicle fuel economy value calculated by equation 5 is displayed in the fifth field 25.

The driver-related fuel economy value calculated at S270 of FIG. 4 is displayed in the sixth field 26.

The baseline value calculated by the performance value calculation process performed at S290 of FIG. 4 is displayed in the seventh field 27.

At S340, the microcomputer 11 performs the same process as performed at S310 for the display of the default screen 20b. However, the performance value calculated by the performance value calculation process performed at S320 of FIG. 4 is displayed in the fourth field 24 of the default screen 20b. The baseline value calculated by the performance value calculation process performed at S320 of FIG. 4 is displayed in the seventh field 27 of the default screen 20b.

In the modified main process of the second embodiment, the vehicle fuel economy value may be calculated at S270 of FIG. 4.

[2-2. Effects of the Second Embodiment]

In the second embodiment, when the microcomputer 11 identifies a certain condition or factor that may affect the fuel economy value, such measurements related to the condition/factor are excluded from the calculation of the performance value. Similar to the first embodiment, by excluding such calculations influenced by factors and conditions having an effect on the fuel economy calculations, the microcomputer 11 limits any decline in the calculation accuracy of the driver-related fuel economy values, the baseline value, and the performance value.

3. Other Embodiments

The embodiments of the present disclosure described above may be further modified and/or adjusted in various manners.

Figure 12:
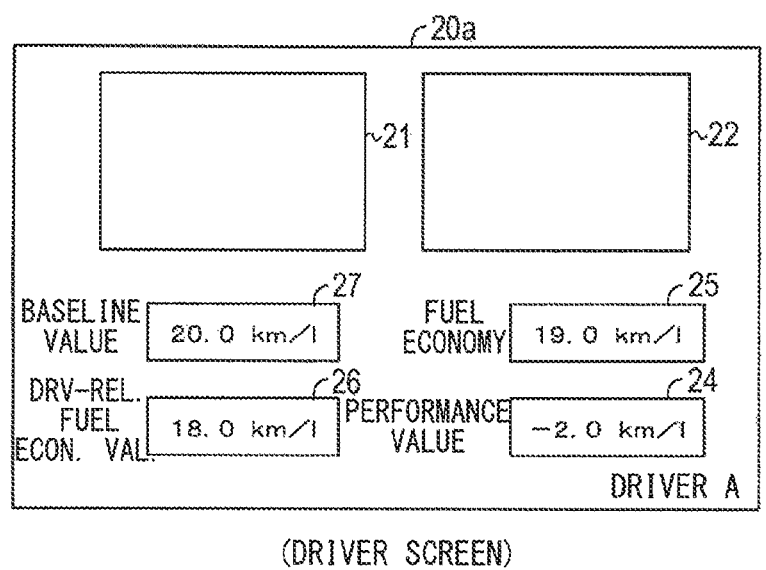
FIG. 12 illustrates a driver screen.

For example, as shown in FIG. 12, the difference calculated at S560 of FIG. 6 may be displayed in the fourth field 24 as the performance value.

The value other than a driver-related fuel economy may be used as a measure of vehicle performance. For example, when a vehicle having the ECU 1 disposed therein is constructed as a racing car or a vehicle for a competition, various quantities such as a lap time of a specific section, a top speed of the vehicle, an acceleration in a travel direction, an acceleration in a lateral direction, a yaw rate and the like may further be calculated in place of the driver-related fuel economy value as a measure of vehicle performance.

A part of the configuration or the processes of the embodiments described herein may be omitted. At least a part of the configuration and/or the processes of an embodiment described herein may be added to or replaced with the configuration and/or the processes of another embodiment described herein.

The ECU having the previously-described configuration(s) may further be described and recited as a system having such ECU, as a program for operating a computer as such ECU, as a non-transitive, substantive memory media for storing such a program, as a method for displaying a drive capacity improvement amount, and the like.

Although the present disclosure has been described in connection with the embodiments herein with reference to the accompanying drawings, it is to be noted that various changes and modifications will become apparent to those skilled in the art, and such changes, modifications, and summarized schemes are to be understood as being within the scope of the present disclosure as defined by appended claims.

What is claimed is:

1. A display controller for use in a vehicle, the display controller comprising:
   a first calculator configured to calculate, a driver-related fuel economy value;
   a second calculator configured to calculate a performance value that indicates a difference between the driver-related fuel economy value and a baseline fuel economy value;
   a display performer configured to control a display device to display the performance value calculated by the second calculator;
   at least one memory configured to store at least one of one or more initial fuel economy values and one or more driver-related fuel economy values; and
   an updater configured to update the at least one memory with the driver-related fuel economy value, wherein
   the at least one memory includes a plurality of storage areas, each of the plurality of storage areas configured to store one of the one or more initial fuel economy values or the one or more driver-related fuel economy values, the one or more initial fuel economy values stored in the plurality of storage areas before the driver-related fuel economy value is calculated, and wherein
   the updater is further configured to update the at least one memory by removing an oldest of the one or more initial fuel economy values or the one or more driver-related fuel economy values before storing a newly calculated driver-related fuel economy value to the memory; and wherein
   the second calculator is further configured to calculate the baseline value as an average of values stored in the plurality of storage areas.

2. The display controller of claim 1, wherein
each of the one or more initial fuel economy values is a value equal to or less than a best possible fuel economy value of the vehicle.

3. The display controller of claim 1, wherein
the one or more initial fuel economy values is a location-based fuel economy value.

4. The display controller of claim 1, wherein
each of the one or more initial fuel economy values is one of two or more location-based fuel economy values.

5. The display controller of claim 1, wherein
each of the one or more initial fuel economy values is one of two or more fuel economy values, the two or more fuel economy values calculated as a fuel economy during two or more test drives of the vehicle.

6. The display controller of claim 4, wherein
the one or more initial fuel economy values are stored in the at least one memory in a repetitive order, wherein a fuel economy value of one of the one more initial fuel economy values differs from a fuel economy value of a next successive initial fuel economy value.

7. The display controller of claim 1, wherein
the first calculator is further configured to determine a certain condition affecting a fuel economy of the vehicle, and wherein
when the first calculator determines the certain condition, the first calculator does not calculate the driver-related fuel economy value.

8. The display controller of claim 7, wherein
the certain condition is at least one of time of day and rainy weather.

9. The display controller of claim 1 further comprising:
an operation determiner configured to calculate an operation assessment value when the operation determiner detects an operation of an operation unit, and to compare the operation assessment value to a predetermined value, wherein when the operation determiner determines that the operation assessment value exceeds the predetermined value, the operation determiner instructs the first calculator to calculate the driver-related fuel economy value.

10. The display controller of claim 1 further comprising:
a driver determiner configured to determine a driver of the vehicle, wherein
the at least one memory is a plurality of memories, and wherein
the second calculator selects one of the plurality of memories based on the driver determined by the driver determiner, and wherein
the updater selects one of the plurality of memories based on the driver determined by the driver determiner.

* * * * *